United States Patent
Yusa et al.

(10) Patent No.: US 11,207,809 B2
(45) Date of Patent: Dec. 28, 2021

(54) METHOD AND APPARATUS FOR MANUFACTURING FOAM MOLDED BODY

(71) Applicant: MAXELL, LTD., Kyoto (JP)

(72) Inventors: Atsushi Yusa, Nagaokakyo (JP); Satoshi Yamamoto, Suita (JP); Hideto Goto, Muko (JP)

(73) Assignee: MAXELL, LTD., Kyoto (JP)

(*) Notice: Subject to any disclaimer, the term of this patent is extended or adjusted under 35 U.S.C. 154(b) by 587 days.

(21) Appl. No.: 16/050,503

(22) Filed: Jul. 31, 2018

(65) Prior Publication Data

US 2018/0339439 A1    Nov. 29, 2018

Related U.S. Application Data

(63) Continuation of application No. PCT/JP2017/005178, filed on Feb. 13, 2017.

(30) Foreign Application Priority Data

Mar. 15, 2016  (JP) .............................. JP2016-050500

(51) Int. Cl.
  *B29C 44/34*    (2006.01)
  *B29C 48/00*    (2019.01)
  (Continued)

(52) U.S. Cl.
  CPC ...... *B29C 44/3453* (2013.01); *B29C 44/3446* (2013.01); *B29C 44/422* (2013.01);
  (Continued)

(58) Field of Classification Search
  CPC ............ B29C 44/3453; B29C 44/3446; B29C 44/422; B29C 44/60; B29C 45/47
  See application file for complete search history.

(56) References Cited

U.S. PATENT DOCUMENTS 5,234,324 A * 8/1993 Kawabata ............. B29C 44/322
  425/4 C
6,322,347 B1 * 11/2001 Xu ....................... B29C 44/3442
  425/376.1
(Continued)

FOREIGN PATENT DOCUMENTS

CN    107073770 A    8/2017
CN    107848183 A    3/2018
(Continued)

OTHER PUBLICATIONS

Mar. 7, 2017 International Search Report issued in International Patent Application No. PCT/JP2017/005178.
(Continued)

*Primary Examiner* — Jacob T Minskey
*Assistant Examiner* — Virak Nguon
(74) *Attorney, Agent, or Firm* — Oliff PLC

(57) ABSTRACT

A producing method for producing a foam-molded product by using a plasticizing cylinder having, from an upstream side in the following order: a plasticization zone, a flow rate adjusting zone and a starvation zone, the producing method includes: plasticizing and melting a thermoplastic resin into a molten resin in the plasticization zone; adjusting a flow rate of the molten resin in the flow rate adjusting zone; allowing the molten resin to be in a starved state in the starvation zone; introducing a pressurized fluid containing the physical foaming agent having a fixed pressure into the starvation zone so as to retain the starvation zone at the fixed pressure; bringing the molten resin in the starved state in contact with the pressurized fluid in the starvation zone in a state in which the starvation zone is retained at the fixed pressure; and molding the molten resin into the foam-molded product.

28 Claims, 4 Drawing Sheets

(51) Int. Cl.

| | |
|---|---|
| *B29C 48/92* | (2019.01) |
| *B29C 45/77* | (2006.01) |
| *B29C 44/42* | (2006.01) |
| *B29C 44/60* | (2006.01) |
| *B29K 67/00* | (2006.01) |
| *B29C 48/605* | (2019.01) |
| *B29C 48/25* | (2019.01) |
| *B29C 48/29* | (2019.01) |
| *B29K 101/12* | (2006.01) |
| *B29K 33/00* | (2006.01) |
| *B29K 69/00* | (2006.01) |
| *B29K 23/00* | (2006.01) |
| *B29C 48/58* | (2019.01) |
| *B29K 77/00* | (2006.01) |
| *B29C 48/53* | (2019.01) |
| *B29C 45/47* | (2006.01) |
| *B29C 45/60* | (2006.01) |

(52) U.S. Cl.
CPC ............ *B29C 44/60* (2013.01); *B29C 45/77* (2013.01); *B29C 48/0012* (2019.02); *B29C 48/92* (2019.02); *B29C 45/47* (2013.01); *B29C 45/60* (2013.01); *B29C 48/268* (2019.02); *B29C 48/29* (2019.02); *B29C 48/53* (2019.02); *B29C 48/58* (2019.02); *B29C 48/605* (2019.02); *B29C 2948/926* (2019.02); *B29K 2023/12* (2013.01); *B29K 2033/08* (2013.01); *B29K 2067/003* (2013.01); *B29K 2069/00* (2013.01); *B29K 2077/00* (2013.01); *B29K 2101/12* (2013.01)

(56) References Cited

U.S. PATENT DOCUMENTS

| | | | |
|---|---|---|---|
| 2002/0017734 A1 | 2/2002 | Sugihara et al. | |
| 2003/0011090 A1* | 1/2003 | Yamaki | B29C 45/60 |
| | | | 264/40.3 |
| 2003/0168766 A1* | 9/2003 | Teraoka | B29C 48/29 |
| | | | 264/50 |
| 2013/0285273 A1* | 10/2013 | Yusa | B29C 48/834 |
| | | | 264/50 |
| 2017/0225372 A1 | 8/2017 | Yamamoto et al. | |
| 2018/0117823 A1 | 5/2018 | Yusa et al. | |

FOREIGN PATENT DOCUMENTS

| | | |
|---|---|---|
| EP | 1393879 A1 | 3/2004 |
| EP | 3321062 A1 | 5/2018 |
| FR | 2098326 A1 | 3/1972 |
| JP | S61-182912 A | 8/1986 |
| JP | 2 625 576 B2 | 7/1997 |
| JP | 2000-119432 A | 4/2000 |
| JP | 2001-341152 A | 12/2001 |
| JP | 2003-165135 A | 6/2003 |
| JP | 2004-237522 A | 8/2004 |
| JP | 3 788 750 B2 | 6/2006 |
| JP | 4 144 916 B2 | 9/2008 |
| JP | 4233240 B2 | 3/2009 |
| JP | 2013-107402 A | 6/2013 |
| JP | 2014-213570 A | 11/2014 |
| KR | 10-2002-0074620 A | 10/2002 |
| WO | 92/17533 A1 | 10/1992 |
| WO | 01/091987 A1 | 12/2001 |
| WO | 2017/007032 A1 | 1/2017 |

OTHER PUBLICATIONS

Sep. 29, 2019 Office Action of Chinese Patent Application No. 201780005864.4.
Jul. 1, 2020 Office Action issued in European Patent Application No. 17766173.3.
Aug. 27, 2019 extended European Search Report issued in European Patent Application No. 17766173.3.
May 1, 2019 Notification of Reason for Refusal issued in Korean Patent Application No. 10-2018-7026532.
Mar. 11, 2021 Office Action issued in European Patent Application No. 17766173.3.

* cited by examiner

METHOD AND APPARATUS FOR MANUFACTURING FOAM MOLDED BODY

CROSS REFERENCE TO RELATED APPLICATION

This application is a Continuation Application of International Application No. PCT/JP2017/005178 which was filed on Feb. 13, 2017 claiming the conventional priority of Japanese patent Application No. 2016-050500 filed on Mar. 15, 2016.

BACKGROUND OF THE INVENTION

Field of the Invention

The present invention relates to a method and an apparatus for producing a foamed molded product (foam-molded product or foam molded body).

Description of the Related Art

In recent years, an injection foam molding method, which uses nitrogen or carbon dioxide in the supercritical state as a physical foaming agent, is researched and practically used (Patent Literature 1: Japanese Patent No. 2625576 corresponding to PCT International Publication WO92/17533; Patent Literature 2: Japanese Patent No. 3788750; and Patent Literature 3: Japanese Patent No. 4144916). According to Patent Literatures 1 to 3, the injection foam molding method, which uses the physical foaming agent, is performed as follow. At first, the physical foaming agent is introduced into a hermetically closed plasticizing cylinder, and the physical foaming agent is brought in contact with and dispersed in a plasticized and melted (molten) resin. The molten resin, in which the physical foaming agent is dispersed, is weighed or metered, and the molten resin is injected and charged into a mold, while retaining (maintaining) a high pressure in the plasticizing cylinder to such an extent that the physical foaming agent is in the supercritical state. The supercritical fluid, which has been compatibly dissolved in the molten resin, is subjected to the sudden pressure reduction during the injection charging, and the supercritical fluid is gasified. The molten resin is solidified, and thus foams or bubbles (foam cells) are formed at the inside of a molded product. In the injection foam molding method as described above, the physical foaming agent is weighed at a pressure which is slightly higher than the internal pressure of the resin. After the weighing, the physical foaming agent is introduced into the plasticizing cylinder. Therefore, the amount of dissolution of the physical foaming agent in the molten resin is determined by the amount of introduction of the physical foaming agent (introduction amount control).

Further, Patent Literature 4 (Japanese Patent Application Laid-open No. 2013-107402 corresponding to U.S. Patent Application Publication 2013/285273) discloses an injection foam molding method based on the use of a physical foaming agent, wherein a part of the physical foaming agent, which is contained in a molten resin, is separated during the molding, and the part of the physical foaming agent is discharged to the outside of a plasticizing cylinder (kneading apparatus) in this method. In Patent Literature 4, the kneading apparatus is disclosed, which is formed with a vent for discharging the physical foaming agent and which has a mechanism for retaining a fixed pressure (constant pressure) of an area (pressure reduction zone) formed with the vent. According to this method, the amount of dissolution of the physical foaming agent in the molten resin is determined by the pressure of a back pressure valve in the pressure reduction zone (pressure control). Therefore, it is unnecessary to correctly control the amount of pouring of the physical foaming agent into the plasticizing cylinder unlike the technique as disclosed in Patent Literatures 1 to 3 described above.

Patent Literatures 5 and 6 (Patent Literature 5: Japanese Patent Application Laid-open No. 2001-341152; and Patent Literature 6: Japanese Patent Application Laid-open No. 2004-237522) also disclose an injection foam molding method based on the use of a physical foaming agent, wherein the physical foaming agent is introduced into a plasticizing cylinder in accordance with the pressure control in this method. In the case of Patent Literatures 5 and 6, a starvation zone, which is unfulfilled with the molten resin, is provided in the plasticizing cylinder, and the physical foaming agent is introduced into the starvation zone.

A production apparatus, which is disclosed in Patent Literatures 5 and 6, has such a structure that the inner diameter of an introducing port for introducing the physical foaming agent is small, and the introducing port is opened intermittently by a check valve or the like, in the same manner as the conventional and general production apparatus. The reason, why the conventional production apparatus, which uses the physical foaming agent, has the structure as described above, is as follows. In the first place, in a case that the physical foaming agent is introduced into the plasticizing cylinder, a harmful influence arises such that the temperature of the physical foaming agent is suddenly raised on account of the contact with the molten resin having a high temperature, and the amount of introduction of the physical foaming agent becomes unstable. On this account, in the case of the conventional production apparatus, the flow passage for the physical foaming agent is narrowed to be thin in order to control the flow rate of the physical foaming agent so that it is intended to stabilize the amount of introduction. In the second place, if the molten resin flows backwardly in the flow passage which is thin as described above, it is feared that the flow passage might be immediately clogged up and the flow passage might malfunction. On this account, the introducing port for introducing the physical foaming agent is not normally open (is not open all the time). Rather, such a structure is adopted that the check valve, injection valve or the like is provided to intermittently open the introducing port.

In the case of the injection foam molding method based on the use of the physical foaming agent as described in Patent Literatures 1 to 3, if the concentration of the physical foaming agent is high in the molten resin, it is feared that the molten resin and the physical foaming agent might cause the phase separation. On this account, it has been necessary that the concentration of the physical foaming agent should be lowered to about ⅕ to ¹/₁₀ of the saturated solubility. Then, in order that a large number of foaming nuclei are formed during the injection charging into the mold while allowing the concentration of the physical foaming agent in the molten resin to be at the low ratio with respect to the saturated solubility, it has been necessary that the physical foaming agent to be introduced into the plasticizing cylinder should be set to have a high pressure and the amount of introduction should be correctly weighed. This results in the main cause or primary factor to complicate the supplying mechanism for supplying the physical foaming agent and raise the initial cost of the apparatus.

On the other hand, in the case of the injection foam molding method based on the use of the physical foaming agent as described in Patent Literature 4, the kneading apparatus, which is adopted as described above, makes it possible to raise the concentration of the physical foaming agent in the molten resin to a concentration approximate to the saturated solubility (saturated concentration) after discharging the part of the physical foaming agent, wherein it is possible to form a large number of foaming nuclei by using the physical foaming agent having a relatively low pressure. However, the injection foam molding method described in Patent Literature 4 involves a seal mechanism which shuts off the pressure reduction zone from other zones by reversely rotating a screw in order to retain a fixed pressure in the pressure reduction zone. On this account, problems arise, for example, such that the screw is lengthened, and the plasticizing weighing time is prolonged because the screw is reversely rotated.

In the case of the injection foam molding method as described in Patent Literatures 5 and 6, the physical foaming agent is introduced into the plasticizing cylinder in accordance with the pressure control. Therefore, it is unnecessary to correctly weigh the amount of introduction of the physical foaming agent. Further, it is not necessarily indispensable to provide the seal mechanism as disclosed in Patent Literature 4. However, according to the investigation performed by the present inventors, in a case that the physical foaming agent is intermittently introduced into the starvation zone in the plasticizing cylinder as disclosed in Patent Literatures 5 and 6, the pressure varies or fluctuates in the starvation zone. As a result, it is feared that the amount of dissolution (amount of permeation) of the physical foaming agent with respect to the molten resin cannot be controlled accurately.

It is speculated that the main cause thereof is the insufficient amount of introduction of the physical foaming agent, because the physical foaming agent is intermittently introduced into the plasticizing cylinder. However, as described above, there are the problem of the difference in temperature between the introduced physical foaming agent and the molten resin and the problem of the backward flow of the molten resin. Therefore, it has been difficult to increase the amount of introduction of the physical foaming agent and contemplate the stabilization by using the apparatus having the structure as disclosed in Patent Literatures 5 and 6.

The present teaching solves the problems described above. The present teaching provides a method for producing a foam-molded product which makes it possible to omit or simplify the complicated control device for the physical foaming agent and which makes it possible to stabilize the amount of dissolution (amount of permeation) of the physical foaming agent with respect to the molten resin by a simple mechanism.

SUMMARY OF THE INVENTION

According to a first aspect of the present teaching, there is provided a producing method for producing a foam-molded product (foamed molded product) by using a plasticizing cylinder having, from an upstream side in the following order: a plasticization zone, a flow rate adjusting zone and a starvation zone, and having an introducing port which is formed in the plasticizing cylinder and via which a physical foaming agent is introduced into the starvation zone, the producing method including:

plasticizing and melting a thermoplastic resin into a molten resin in the plasticization zone;

adjusting a flow rate of the molten resin in the flow rate adjusting zone;

allowing the molten resin, of which flow rate has been adjusted in the flow rate adjusting zone, to be in a starved state in the starvation zone;

introducing a pressurized fluid containing the physical foaming agent having a fixed pressure into the starvation zone so as to retain the starvation zone at the fixed pressure;

bringing the molten resin in the starved state in contact with the pressurized fluid containing the physical foaming agent having the fixed pressure in the starvation zone in a state in which the starvation zone is retained at the fixed pressure; and molding the molten resin, having been brought in contact with the pressurized fluid containing the physical foaming agent, into the foam-molded product.

In the present aspect, the molten resin may be pressurized with the pressurized fluid containing the physical foaming agent in the starvation zone. Further, the starvation zone may be retained constantly at the fixed pressure during production of the foam-molded product.

In the present aspect, an inner diameter of the introducing port may be in a range of 20% to 100% of an inner diameter of the plasticizing cylinder. Further, the introducing port may be opened at all times.

Further, in the present aspect, the plasticizing cylinder may have an introducing speed adjusting container connected to the introducing port; the producing method may further include supplying the pressurized fluid containing the physical foaming agent to the introducing speed adjusting container; and the pressurized fluid containing the physical foaming agent having the fixed pressure may be introduced into the starvation zone from the introducing speed adjusting container. A volume of the introducing speed adjusting container may be in a range of 5 mL to 10 L.

In the present aspect, the producing method may further include:

detecting expansion of the molten resin from the introducing port; and stopping driving of the plasticizing cylinder in a case that the expansion of the molten resin from the introducing port is detected.

Further, a chemical foaming agent may be contained in the thermoplastic resin in an amount in a range of 0.1% by weight to 3% by weight.

In the present aspect, the flow rate of the molten resin may be adjusted by depressurizing and compressing the molten resin in the flow rate adjusting zone.

Alternatively, in the flow rate adjusting zone, the flow rate of the molten resin may be adjusted by gradually raising the flow rate of the molten resin along a flowing direction of the molten resin.

Still alternatively, in the flow rate adjusting zone, the flow rate of the molten resin may be adjusted by gradually lowering a pressure of the molten resin along a flowing direction of the molten resin.

According to a second aspect of the present teaching, there is provided a producing apparatus which produces a foam-molded product (foamed molded product) including:

a plasticizing cylinder which is provided with a plasticizing screw rotatably arranged in the plasticizing cylinder, which has a plasticization zone for plasticizing and melting a thermoplastic resin into a molten resin, a flow rate adjusting zone for adjusting a flow rate of the molten resin and a starvation zone for allowing the molten resin to be in a starved state, and which is formed with an introducing port for introducing a physical foaming agent into the starvation zone;

an introducing speed adjusting container which is connected to the introducing port; and a physical foaming agent supplying mechanism which is connected to the introducing speed adjusting container and which supplies the physical foaming agent to the plasticizing cylinder via the introducing speed adjusting container;

wherein a pressurized fluid containing the physical foaming agent having a fixed pressure is introduced into the starvation zone so as to retain the starvation zone at the fixed pressure;

the molten resin in the starved state is brought in contact with the pressurized fluid containing the physical foaming agent having the fixed pressure in the starvation zone in a state in which the starvation zone is retained at the fixed pressure; and the molten resin having been brought in contact with the pressurized fluid containing the physical foaming agent is molded into the foam-molded product.

In the present aspect, an inner diameter of the introducing port may be in a range of 20% to 100% of an inner diameter of the plasticizing cylinder; a volume of the introducing speed adjusting container may be in a range of 5 mL to 10 L; and the introducing port may be an introducing port which is opened at all times. Further, the introducing speed adjusting container may be provided with an expansion detecting mechanism which detects expansion of the molten resin from the introducing port.

In the present aspect, the plasticizing cylinder may further include a compression zone for compressing the molten resin, the compressing zone being arranged on an upstream side of the flow rate adjusting zone;

the plasticizing screw may have a pressure reducing portion and a compressing portion which are positioned in the flow rate adjusting zone;

a diameter of a shaft of the plasticizing screw in the pressure reducing portion is smaller than a maximum value of the diameter of the shaft of the plasticizing screw in a portion positioned in the compression zone; and the diameter of the shaft of the plasticizing screw in the compressing portion may be greater than a minimum value of the diameter of the shaft of the plasticizing screw in the pressure reducing portion.

Further, the plasticizing screw may have a screw flight which has a notch and which is positioned in the flow rate adjusting zone. Furthermore, in the flow rate adjusting zone, the diameter of the shaft of the plasticizing screw may be continuously smaller from an upstream side toward a downstream side.

DESCRIPTION OF THE PREFERRED EMBODIMENT

An explanation will be made about the method for producing the foamed molded product of the embodiment of the present teaching with reference to the flow chart shown in FIG. 1.

(1) Apparatus for Producing Foamed Molded Product

Figure 2:
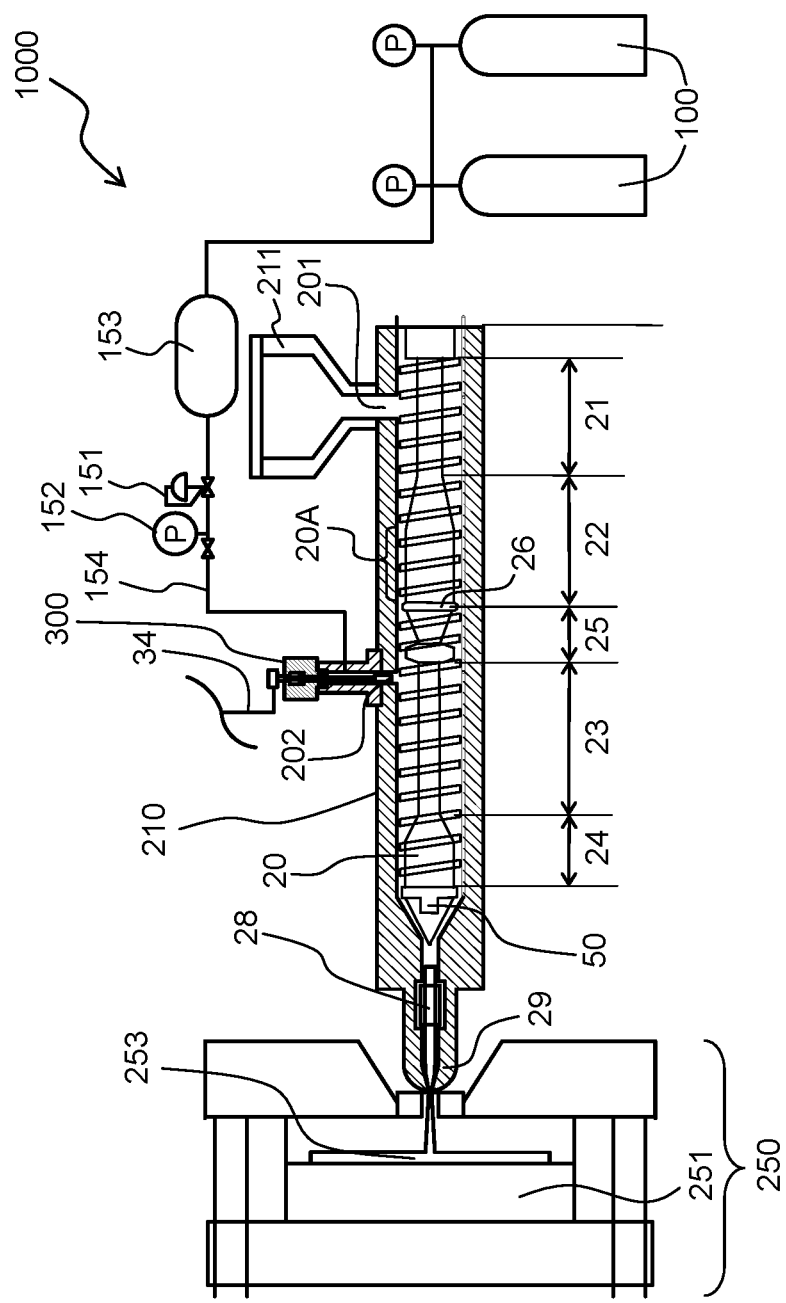
FIG. 2 schematically shows an apparatus for producing the foamed molded product used in the embodiment.

At first, an explanation will be made about an apparatus (a production apparatus) for producing the foamed molded product used in the embodiment of the present teaching. In the embodiment of the present teaching, the foamed molded product is produced by using a production apparatus (injection molding apparatus) 1000 shown in FIG. 2. The production apparatus 1000 principally includes a plasticizing cylinder 210 which includes a screw (plasticizing screw) 20 provided rotatably and internally, a bomb 100 which serves as a physical foaming agent supplying mechanism for supplying a physical foaming agent to the plasticizing cylinder 210, a clamping unit 250 which is provided with a mold 251, and a control device (controller) (not shown) which is provided to control the operations of the plasticizing cylinder 210 and the clamping unit 250. A molten resin, which is plasticized and melted in the plasticizing cylinder 210, flows from the right to the left as viewed in FIG. 2. Therefore, at the inside of the plasticizing cylinder 210 of the embodiment of the present teaching, the right as viewed in FIG. 2 is defined as "upstream" or "backward", and the left is defined as "downstream" or "frontward".

The plasticizing cylinder has, from the upstream side in the following order: a plasticization zone 21 in which a thermoplastic resin is plasticized and melted into the molten resin, a compression zone 22 in which the molten resin is compressed, a flow rate adjusting zone 25 in which a flow rate of the molten resin is adjusted, and a starvation zone 23 in which the molten resin is allowed to be in the starved state.

The "starved state" is a state in which the interior of the starvation zone 23 is not fulfilled with the molten resin and the interior of the starvation zone 23 is unfulfilled. Therefore, the space other than the portion occupied by the molten resin exists in the starvation zone 23. Further, an introducing port 202, which is provided to introduce the physical foaming agent into the starvation zone 23, is formed. An introducing speed adjusting container 300 is connected to the introducing port 202. The bomb 100 supplies the physical foaming agent to the plasticizing cylinder 210 via the introducing speed adjusting container 300.

Note that the production apparatus 1000 has only one flow rate adjusting zone 25 and only one starvation zone 23. However, the production apparatus, which is usable for the embodiment of the present teaching, is not limited to this. For example, in order to facilitate the permeation of the physical foaming agent into the molten resin, it is also allowable to adopt such a structure that a plurality of flow rate adjusting zones 25, a plurality of starvation zones 23 and a plurality of introducing ports 202 formed in the plurality of starvation zones 23, respectively, are provided, and that the physical foaming agent is introduced into the plasticizing cylinder 210 from the plurality of introducing ports 202. Further, the production apparatus 1000 is the injection molding apparatus. However, the production apparatus, which is usable for the embodiment of the present teaching, is not limited to the injection molding apparatus. For example, it is also allowable to use an extrusion molding apparatus for the present embodiment.

(2) Method for Producing Foamed Molded Product

Figure 1:
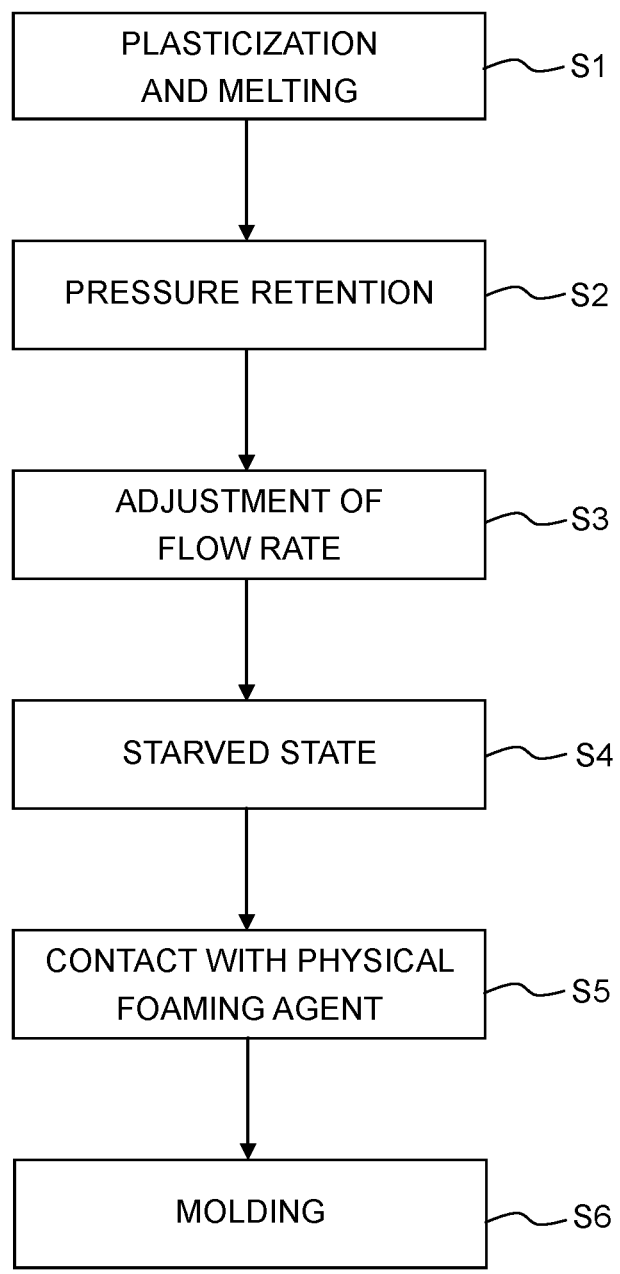
FIG. 1 shows a flow chart illustrating a method for producing a foamed molded product according to an embodiment.

At first, the thermoplastic resin is plasticized and melted to provide the molten resin in the plasticization zone 21 of the plasticizing cylinder 210 (Step S1 shown in FIG. 1). As for the thermoplastic resin, it is possible to use various resins depending on the type of the objective molded product. Specifically, it is possible to use, for example, thermoplastic resins such as polypropylene, polymethyl methacrylate, polyamide, polycarbonate, amorphous polyolefin, polyether imide, polyethylene terephthalate, polyether ether ketone, ABS resin (acrylonitrile butadiene styrene copolymer resin), polyphenylene sulfide, polyamide imide, polylactic acid, polycaprolactone and the like, and composite materials thereof. These thermoplastic resins may be used singly, or they may be used by mixing two or more. It is also possible to use those obtained by kneading, in the thermoplastic resins, various organic or inorganic fillers such as glass fibers, talc, carbon fibers, cellulose nanofibers, and the like. It is preferable that the thermoplastic resin is mixed with an inorganic filler which functions as a foaming nucleating agent and/or an additive which increases the melt tension. By mixing the materials as described above with each other, it is possible to obtain fine foam cells. The thermoplastic resin of the embodiment of the present teaching may contain various general purpose additives other than the above, if necessary.

Further, the thermoplastic resin of the embodiment may contain a general purpose chemical foaming agent. By allowing the thermoplastic resin to contain a small amount of the chemical foaming agent, the foaming performance can be supplemented. The chemical foaming agent is not particularly limited or restricted, under a condition that the chemical foaming agent is decomposable at a temperature at which the thermoplastic resin is plasticized and melt, and generates a foaming gas. It is possible to use, as the chemical foaming agent, for example: an organic foaming agent such as azodicarbonamide (ADCA), N,N'-dinitroso pentamethylene tetramine, 4,4'-oxybis(benzene sulfonyl hydrazide), diphenyl sulfone-3,3'-disulfonyl hydrazide, p-toluenesulfonyl semicarbazide, trihydrazinotriazine, azobisisobutyronitrile, and the like; mixture of polycarboxylic acid such as citric acid, oxalic acid, furamic acid, phthalic acid, malic acid, tartaric acid, cyclohexane,-1,2-dicarboxylic acid, camphoric acid, ethylene diamine tetraacetic acid, triethyleneteraamine hexaacetic acid, nitrilotriacetic acid, and the like, with an inorganic carbon compound such as sodium hydrogencarbonate, sodium aluminum hydrogencarbonate, potassium hydrogencarbonate, ammonium hydrogencarbonate, ammonium carbonate, and the like; salt of poly-carboxylic acid such as sodium dihydrogen citrate, potassium oxalate, and the like. It is allowable to use any one of these chemical foaming agents single, or two or more of the chemical foaming agents in a mixture manner. In view of a by-product generated during the decomposition, the inorganic foaming agent such as hydrogencarbonate is preferred, and the sodium hydrogen carbonate is particularly preferred. The by-product generated during the decomposition of the hydrogencarbonate such as the sodium hydrogen carbonate is mainly carbon dioxide and water, and there is little fear that the production apparatus and/or the mold might be contaminated therewith.

The chemical foaming agent is contained in the thermoplastic resin preferably in an amount in a range of 0.1% by weight to 3% by weight, more preferably in an amount in a range of 0.1% by weight to 1% by weight, further more preferably in an amount in a range of 0.1% by weight to 0.5% by weight. In a case that the content amount of the chemical foaming agent in the resin material is not less than 0.1% by weight, the foaming performance can be supplemented sufficiently; in a case that the content amount of the chemical foaming agent in the resin material is not more than 3% by weight, there is no such a fear that any pollutant (contaminant) due to the by-product of the chemical foaming agent might adhere to the mold and/or extruding die, etc.

In the embodiment of the present teaching, the thermoplastic resin is plasticized and melted in the plasticizing cylinder 210 including the screw 20 provided internally as shown in FIG. 2. A band heater (not shown) is arranged on an outer wall surface of the plasticizing cylinder 210, and the plasticizing cylinder 210 is heated thereby. Further, the shearing heat generated by the rotation of the screw 20 is also added, and thus the thermoplastic resin is plasticized and melted.

In the next place, the physical foaming agent having a fixed pressure (constant pressure or given pressure) is introduced into the starvation zone 23, and the starvation zone 23 is retained at the fixed pressure (Step S2 shown in FIG. 1).

A pressurized fluid is used as the physical foaming agent. In the embodiment of the present teaching, the "fluid" means any one of liquid, gas, and supercritical fluid. Further, the physical foaming agent is preferably, for example, carbon dioxide or nitrogen in view of the cost and the load on the environment. In the embodiment of the present teaching, the pressure of the physical foaming agent is relatively low. Therefore, for example, it is possible to use the fluid taken out from the bomb stored with the fluid including, for example, a nitrogen bomb, a carbon dioxide bomb, and an air bomb, while the pressure is reduced to provide the fixed pressure by a pressure reducing valve. In this case, it is unnecessary to use any pressure-raising apparatus. Therefore, it is possible to reduce the cost of the entire production apparatus. Further, the fluid, for which the pressure is raised to a predetermined pressure, may be used as the physical foaming agent, if necessary. For example, in a case that nitrogen is used as the physical foaming agent, the physical foaming agent can be produced by the following method. At first, the air of the atmospheric air is allowed to pass through a nitrogen separation membrane while compressing the air by a compressor so that nitrogen is purified. Subsequently, the pressure of purified nitrogen is raised to the predetermined pressure by using, for example, a booster pump or a syringe pump, and thus the physical foaming agent is produced.

The pressure of the physical foaming agent introduced into the starvation zone 23 is fixed or constant. The pressure of the starvation zone 23 is retained at the fixed pressure which is the same as that of the physical foaming agent to be introduced. The pressure of the physical foaming agent is preferably in a range of 1 MPa to 15 MPa, more preferably in a range of 2 MPa to 10 MPa, and much more preferably in a range of 2 MPa to 8 MPa. The optimum pressure differs depending on the type of the molten resin. However, by allowing the pressure of the physical foaming agent to be not less than 1 MPa, it is thereby possible to permeate, into the molten resin, the physical foaming agent in an amount required to cause the foaming. In a case that the pressure of the physical foaming agent is not more than 15 MPa, it is thereby possible to reduce the load on the apparatus. Note that the phrase that the pressure of the physical foaming agent for pressurizing the molten resin is "fixed" or "constant"" means that the range of fluctuation of the pressure with respect to the predetermined pressure is preferably within ±10% and more preferably within ±5%. The pressure of the starvation zone is measured, for example, by a pressure sensor (not shown) provided at a position opposed to or facing the introducing port 202 of the plasticizing cylinder 210.

In the embodiment of the present teaching, as shown in FIG. 2, the physical foaming agent is fed from the bomb 100, and the physical foaming agent is supplied from the introducing port 202 into the starvation zone 23 via the introducing speed adjusting container 300. The pressure of the physical foaming agent is reduced to the predetermined pressure by using a pressure reducing valve 151, and then the physical foaming agent is introduced into the starvation zone 23 from the introducing port 202 without passing through, for example, a pressure raising apparatus. In the embodiment of the present teaching, for example, the time of introduction and the amount of introduction of the physical foaming agent introduced into the plasticizing cylinder 210 are not controlled. Therefore, it is unnecessary to provide any mechanism for controlling them, for example, a driving valve based on the use of, for example, a check valve and/or a solenoid-operated valve. The introducing port 202 has no driving valve, and the introducing port 202 is always or normally open (open at all times). In the embodiment of the present teaching, the area, which ranges from the pressure reducing valve 151 via the introducing speed adjusting container 300 to the starvation zone 23 in the plasticizing cylinder 210, is retained, by the physical foaming agent supplied from the bomb 100, at the fixed pressure of the physical foaming agent.

The introducing port 202 for the physical foaming agent has an inner diameter which is larger than that of an introducing port for the physical foaming agent of any conventional production apparatus. On this account, even in the case of the physical foaming agent having a relatively low pressure, the physical foaming agent can be efficiently introduced into the plasticizing cylinder 210. Further, even in a case that a part of the molten resin is solidified by being brought in contact with the introducing port 202, the introducing port 202 can function as the introducing port without being completely clogged up, because the inner diameter of the introducing port 202 is large. On the other hand, if the inner diameter of the introducing port 202 is excessively large, the staying of the molten resin arises, which causes any defective molding. Further, the introducing speed adjusting container 300, which is connected to the introducing port 202, is thus made large-sized, resulting in the increase in the cost of the entire apparatus. Specifically, the inner diameter of the introducing port 202 is preferably in a range of 20% to 100% of the inner diameter of the plasticizing cylinder 210 and more preferably in a range of 30% to 80% of the inner diameter of the plasticizing cylinder 210. Alternatively, the inner diameter of the introducing port 202 is preferably in a range of 3 mm to 100 mm and more preferably in a range of 5 mm to 50 mm, without depending on the inner diameter of the plasticizing cylinder 210.

The introducing speed adjusting container 300, which is connected to the introducing port 202, has a volume which is not less than a certain value. Accordingly, it is possible to obtain a slow or gentle flow rate of the physical foaming agent introduced into the plasticizing cylinder 210, and it is possible to secure the time for enabling the physical foaming agent to stay in the introducing speed adjusting container 300. By allowing the physical foaming agent to stay in the vicinity of the heated plasticizing cylinder 210, the physical foaming agent is thereby heated or warmed. The difference in temperature between the physical foaming agent and the molten resin is decreased, and it is possible to stabilize the amount of dissolution (amount of permeation) of the physical foaming agent into the molten resin. That is, the introducing speed adjusting container 300 functions as a buffer container. On the other hand, if the volume of the introducing speed adjusting container 300 is excessively large, the cost of the entire apparatus is increased. Although depending on the amount of the molten resin existing in the starvation zone 23, the volume of the introducing speed adjusting container 300 is preferably in a range of 5 mL to 10 L and more preferably in a range of 10 mL to 1 L. In a case that the volume of the introducing speed adjusting container 300 is within this range, it is possible to secure the time for enabling the physical foaming agent to stay while taking the cost into consideration.

Further, as will be described later on, by bringing the physical foaming agent in contact with the molten resin, the physical foaming agent permeates into the molten resin. Thus, the physical foaming agent is consumed in the plasticizing cylinder 210. In order to retain the fixed pressure of the starvation zone 23, the physical foaming agent, which corresponds to the consumed amount, is introduced into the starvation zone 23 from the introducing speed adjusting container 300. If the volume of the introducing speed adjusting container 300 is excessively small, then the frequency of replacement of the physical foaming agent is raised, and hence the temperature of the physical foaming agent becomes unstable. As a result, it is feared that the supply of the physical foaming agent might become unstable. Therefore, it is preferable that the introducing speed adjusting container 300 has such a volume that the physical foaming agent, which corresponds to the amount consumed in the plasticizing cylinder for 1 minute to 10 minutes, can stay.

Note that the introducing speed adjusting container 300 may be a container which is an individual container which is distinct from the plasticizing cylinder 210. Alternatively, the introducing speed adjusting container 300 may be formed integrally with the plasticizing cylinder 210, and the introducing speed adjusting container 300 may constitute a part of the plasticizing cylinder 210. Further, in the embodiment of the present teaching, only the physical foaming agent is introduced into the starvation zone 23. However, another pressurized fluid other than the physical foaming agent may be simultaneously introduced into the starvation zone 23 to such an extent that the effect of the present teaching is not affected thereby. In this case, the pressurized fluid containing the physical foaming agent, which is introduced into the starvation zone 23, has the fixed pressure described above.

Next, the molten resin is caused to flow from the plasticization zone 21 to the starvation zone 23, via the compression zone 22 and the flow rate adjusting zone 25. The molten resin is compressed in the compression zone 22; then the flow rate of the molten resin is adjusted in the flow rate adjusting zone 25 (step S3 in FIG. 1), and the molten resin is allowed to be in the starved state in the starvation zone 23 (step S4 in FIG. 1). In the following, explanation will be given about each of the compression zone 22, the flow rate adjusting zone 25 and the starvation zone 23, and explanation will be given further about each of the steps, in the method for producing the foamed molded product of the embodiment, which is performed in one of the above-described zones.

Firstly, the compression zone 22 will be explained. In the embodiment, the compression zone 22 is arranged on the upstream side of the starvation zone 23, thereby allowing the molten resin to be in the starved state in the starvation zone 23. The starved state is determined by the balance between the feed amount of the molten resin fed from the upstream of the starvation zone 23 to the starvation zone 23 and the feed amount of the molten resin fed from the starvation zone 23 to the downstream thereof. If the former is smaller, the starved state is given. In the present embodiment, this state is realized by arranging the compression zone 22 on the upstream side of the starvation zone 23.

The compression zone 22 is provided with a large diameter portion 20A in which the diameter (screw diameter) of the shaft of the screw 20 is larger (thicker) than that of the plasticization zone 21 positioned on the upstream side and the screw flight is shallowed in a stepwise manner. Further, a ring 26 is provided at a downstream end of the large diameter portion 20A. The ring 26 has a half-divided structure, and the ring 26 is installed by covering the screw 20 with the parts thereof divided into two. In a case that the diameter of the shaft of the screw is increased, then the clearance between the screw 20 and the inner wall of the plasticizing cylinder 210 is decreased, and it is possible to reduce the supply amount of the resin fed to the downstream. Therefore, it is possible to raise the flow resistance of the molten resin. Further, the flow resistance of the molten resin can be also raised in the same manner as described above by providing the ring 26 for the screw 20. Therefore, in the embodiment of the present teaching, the large diameter portion 20A and the ring 26 are the mechanisms for raising the flow resistance of the molten resin. Further, the ring 26 is also capable of suppressing any backward flow of the physical foaming agent to the upstream side. Namely, the ring 26 is a counter flow (backward flow) preventing mechanism (seal mechanism), which prevents any counter flow (backward flow) of the molten resin. Accordingly, the ring 26 is preferably arranged between the compression zone 22 and the flow rate adjusting zone 25 arranged on the downstream side of the compression zone 22.

The mechanism, which is provided in the compression zone 22 and which raises the flow resistance of the molten resin, is not specifically limited, provided that the mechanism temporarily reduces the flow passage area for allowing the molten resin to pass in order to restrict the flow rate of the resin supplied from the compression zone 22 to the starvation zone 23. In the embodiment of the present teaching, both of the large diameter portion 20A of the screw and the ring 26 are used. However, it is allowable to use only one of the large diameter portion 20A and the ring 26. Further, as the mechanism for raising the flow resistance, it is allowable to provide, on the screw 20, for example, a portion in which the pitch of the screw flight is narrowed as compared with the starvation zone 23, a portion in which the number of the flight is increased as compared with the starvation zone 22, and/or a portion in which the winding direction of the flight is reverse to that in the starvation zone 22.

The mechanism for raising the flow resistance of the molten resin may be provided for the screw, for example, as the ring which is the member distinct from the screw. Alternatively, the mechanism may be provided integrally with the screw as a part of the structure of the screw. In a case that the mechanism for raising the flow resistance of the molten resin is provided, for example, as the ring which is the member distinct from the screw, the size of the clearance portion as the flow passage for the molding method can be changed by changing the ring. Therefore, an advantage is obtained such that the magnitude of the flow resistance of the molten resin can be changed with ease.

Further, other than the mechanism for raising the flow resistance of the molten resin, the molten resin can be also in the starved state in the starvation zone 23 by providing the counter flow (backward flow) preventing mechanism (seal mechanism), which prevents any counter flow (backward flow) of the molten resin. For example, the counter flow preventing mechanism can be exemplified by the seal mechanism including, for example, a steel ball or a ring which is movable to the upstream side in accordance with the pressure of the physical foaming agent. However, the counter flow preventing mechanism requires a driving portion, and hence it is feared that the resin might stay. On this account, it is preferable to use the mechanism for raising the flow resistance having no driving portion.

Figure 6:
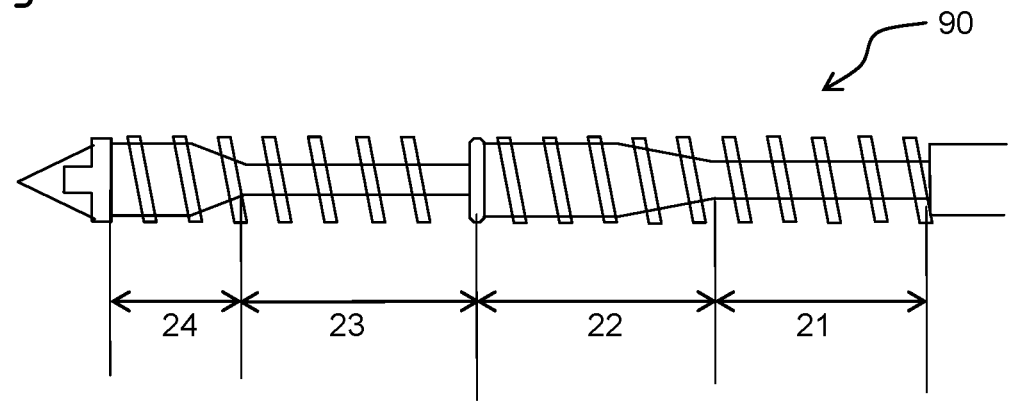
FIG. 6 schematically shows a plasticizing screw arranged in the inside of a plasticizing cylinder which does not have any flow rate adjusting zone.

Next, the flow rate adjusting zone 25 will be explained. In the present embodiment, the flow rate adjusting zone 25 is disposed between the compression zone 22 and the starvation zone 23. In a case that the flow rate of the molten resin in the compression zone 22 located on the upstream side of the flow rate adjusting zone 25 is compared with the flow rate of the molten resin in the starvation zone 23 located on the downstream side of the flow rate adjusting zone 25, the flow rate of the molten resin in the starvation zone 23 is faster than that in the compression zone 22. For example, in a plasticizing cylinder using a screw 90 shown in FIG. 6, the compression zone 22 and the starvation zone 23 are arranged such that the zones 22 and 23 are adjacent to each other. Although it is possible to allow the molten resin to be in the starved state also in the plasticizing cylinder using the screw 90, the flow rate is raised rapidly or suddenly in a case that the molten resin flows from the compression zone 22 to the starvation zone 23. The inventors of the present inventor found out that the foaming performance of a foamed molded body produced in the above-described manner was increased by providing the flow rate adjusting zone 23, serving as a buffer zone, between the compression zone 22 and the starvation zone 23 to thereby suppress this rapid change (raising) in the flow rate of the molten resin.

Figure 4:
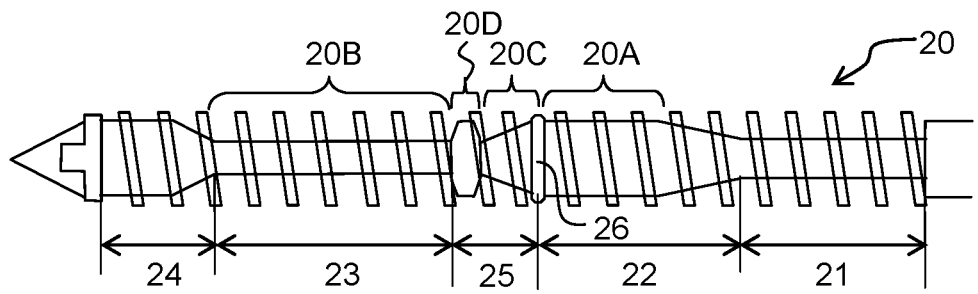
FIG. 4 schematically shows a plasticizing screw arranged in the inside of a plasticizing cylinder used in the embodiment.

The flow rate of the molten resin can be adjusted, for example, by providing a mechanism configured to adjust the flow rate of the molten resin in a part or portion, of the plasticizing screw 20, positioned in the flow rate adjusting zone 25. In the present embodiment, a plasticizing screw 20 as shown in FIGS. 2 and 4 is used. The plasticizing screw 20 has, from the upstream side in the following order: a large diameter portion 20A, a pressure reducing portion 20C, a compressing portion 20D and a small diameter portion 20B. The large diameter portion 20A is positioned in the compression zone 22; the pressure reducing portion 20C and the compressing portion 20D are positioned in the flow rate adjusting zone 25; and the small diameter portion 20B is positioned in the starvation zone 23. The pressure reducing portion 20C and the compressing portion 20D each correspond to the mechanism for adjusting the flow rate of the molten resin. In the pressure reducing portion 20C, the screw diameter (diameter of the shaft of the screw) is made to be continuously smaller (thinner) from the upstream side toward the downstream side; accompanying with this, the depth of the screw flight is made to be continuously deeper. The compressing portion 20D has a larger screw diameter and a shallower screw flight, as compared with the portions of the plasticizing screw 20 which are located on the upstream and downstream sides of the compressing portion 20D. Namely, in the present embodiment, the diameter of the shaft of the screw 20 in the pressure reducing portion 20C is smaller than the maximum value of the diameter of the shaft 20 in the portion located at the compression zone 22 (large diameter portion 20A). Further, the diameter of the shaft 20 in the compressing portion 20D is greater than the minimum value of the diameter of the shaft of the screw 20 in the pressure reducing portion 20C. The molten resin allowed to flow from the compression zone 22 to the flow rate adjusting zone 25 is subjected to the pressure reduction in the pressure reducing portion 20C in which the depth of the screw flight is deep, then the molten resin is subjected to the re-compression in the compressing portion 20D in which the depth of the screw flight is shallow, and after that, the molten resin is allowed to flow into the starvation zone 23. By depressurizing and compressing (pressurizing) the molten resin in the flow rate adjusting zone 25, it is possible to secure the staying time (dwell time) of the molten resin in the flow rate adjusting zone 25. With this, the flow rate adjusting zone 25 serves or functions as a buffer zone or a molten resin staying zone and adjusts the flow rate of the molten resin (step S3 in FIG. 1), resulting in suppressing any rapid raising in the flow rate of the molten resin flowing from the compression zone 22 toward the starvation zone 23.

Figure 5A:
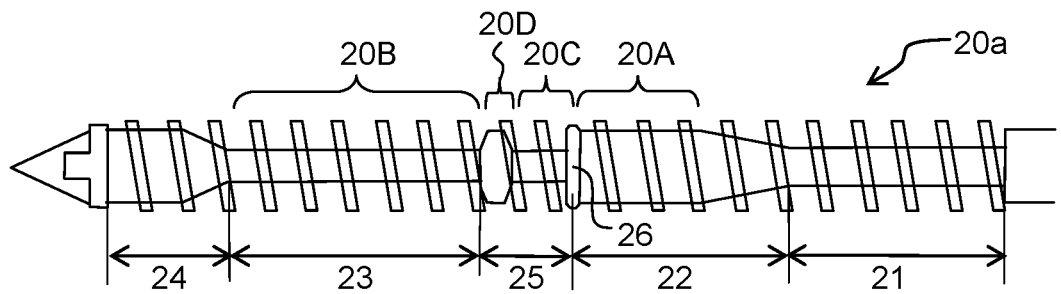
FIGS. 5A to 5C each schematically show another example of the plasticizing screw arranged in the inside of the plasticizing cylinder used in the embodiment.

Note that although the screw 20 used in the present embodiment has only one pair of the pressure reducing portion 20C and the compressing portion 20D, the screw 20 may have a plurality of pairs of the pressure reducing portion 20C and the compressing portion 20D, and may repeats the pressure reduction (depressurization) and the compression of the molten resin for a plurality of times. Further, in the screw 20, although the screw diameter of the pressure reducing portion 20C is made to be continuously smaller from the upstream toward the downstream, there is no limitation to this structure. Under a condition that the screw diameter of the pressure reducing portion 20C is smaller than those of the large diameter portion 20A and the compressing portion 20D, it is possible to perform the pressure reduction for the molten resin in the pressure reducing portion 20C. Accordingly, as shown for example in FIG. 5A, the screw diameter of the pressure reducing portion 20C may have a constant size (thickness).

Although the specific reason is unknown as to why the foaming performance of the foamed molded product is improved by providing the flow rate adjusting zone 25 which serves as the buffer zone between the compression zone 22 and the starvation zone 23, a factor or reason thereof is assumed that the molten resin staying in the flow rate adjusting zone 25 lengthen or prolongs a contact time during which the physical foaming agent makes contact with the molten resin. Although the physical foaming agent is introduced to the starvation zone 23, the physical foaming agent also spreads to the flow rate adjusting zone 25 located on the upstream side of the starvation zone 23, and makes contact with the molten resin in the flow rate adjusting zone 25. With this, a larger amount of the physical foaming agent is dissolved in the molten resin. Further, by providing the flow rate adjusting zone 25, it is possible to maintain the starved state of the molten resin more stably in the starvation zone 23 on the downstream side of the flow rate adjusting zone 25. This also promotes the contact between the physical foaming agent and the molten resin, causing a larger amount of the physical foaming agent to dissolve in the molten resin. Furthermore, in the present embodiment, it is assumed that the dissolution of the physical foaming agent to the molten resin is promoted also by subjecting the molten resin to the compression in the compressing portion 20D of the screw 20.

As described above, in the apparatus 1000 as shown in FIG. 2, the flow rate of the molten resin is adjusted by providing the pressure reducing portion 20C and the compressing portion 20D, namely by changing the depth of the screw flight, further in other words by changing the size (thickness) of the screw diameter, at portions, respectively, of the plasticizing screw 20, which are positioned in the flow rate adjusting zone 25, as shown in FIG. 4. However, the present embodiment is not limited to or restricted by this. A plasticizing screw having any configuration may be used, provided that the plasticizing screw has a configuration capable of adjusting the flow rate of the molten resin in the flow rate adjusting zone 25. For example, the flow rate of the molten resin in the flow rate adjusting zone 25 can be adjusted also by narrowing the pitch of the flight of the screw 20, increasing the number of the flight, or reversing the winding direction of the flight, as compared with that in the starvation zone 23.

Figure 5B:
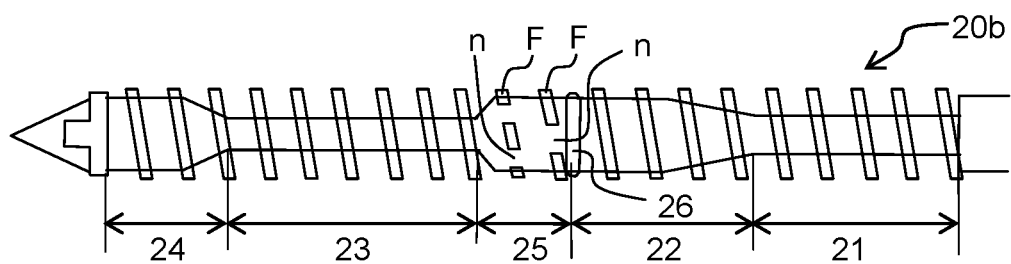

Further, a screw 20b as shown in FIG. 5B has a screw flight F in which a plurality of notches (cutouts) n are formed in a portion positioned in the flow rate adjusting zone 25. The screw flight F formed with the plurality of notches n corresponds to the mechanism for adjusting the flow rate of the molten resin. The molten resin is moved less easily in a case that a notch(es) is (are) provided on the screw flight, and thus the molten resin stays in the flow rate adjusting zone 25. With this, the flow rate adjusting zone 25 serves as the buffer zone or the staying zone for the molten resin so as to adjust the flow rate of the molten resin (step S3 in FIG. 1). As a result, it is possible to suppress any rapid increase in the flow rate of the molten resin flowing form the compression zone 22 toward the starvation zone 23. Further, the screw 20b may have a so-called labyrinth structure by the screw flight formed with the plurality of notches n. In such a case, the labyrinth structure corresponds to the mechanism for adjusting the flow rate of the molten resin. Owing to the labyrinth structure, the molten resin passes the flow rate adjusting zone 25 from the compression zone 22 toward the starvation zone 23, while gradually raising the flow rate. With this, the flow rate adjusting zone 25 makes it possible to gradually increase the flow rate of the molten resin in the compression zone 22 on the upstream side thereof and to convey the molten resin to the starvation zone 23 on the downstream side thereof, without any rapid change in the flow rate. Further, there is also a difference in resin pressure between the compression zone 22 and the starvation zone 23. The resin pressure is high in the compression zone 22 and is low in the starvation zone 23. The molten resin passes the flow rate adjusting zone 25 from the compression zone 22 toward the starvation zone 23, while gradually lowering the pressure. With this, the flow rate adjusting zone 25 makes it possible to gradually lower the pressure of the molten resin in the compression zone 22 on the upstream side thereof and to convey the molten resin to the starvation zone 23 on the downstream side thereof, without any rapid change in the resin pressure. From this viewpoint, the flow rate adjusting zone 25 is also a slow or gradual pressure-reducing zone for the molten resin.

Figure 5C:
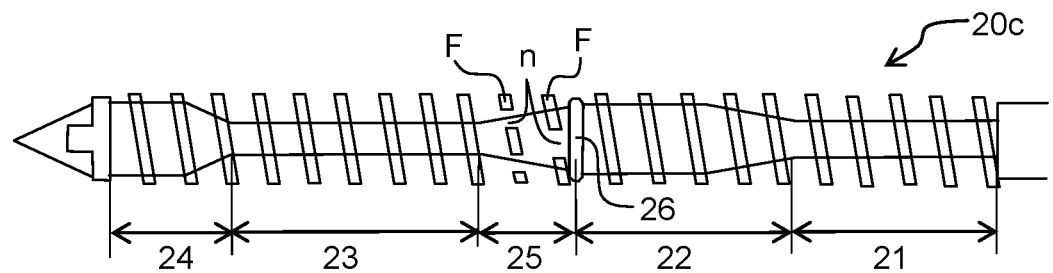

Further, it is allowable that as in a screw 20c shown in FIG. 5C, a portion of the screw positioned in the flow rate adjusting zone 25 may have a screw flight F formed with a plurality of notches n, and further that the screw diameter is made to be continuously smaller from the upstream toward the downstream.

In the present embodiment, the length of the flow rate adjusting zone 25 in the flowing direction of the molten resin is preferably a value which is in a range of one time to six times the inner diameter of the plasticizing cylinder 210, more preferably a value which is in a range of two times to four times the inner diameter of the plasticizing cylinder 210. Under a condition that the length of the flow rate adjusting zone 25 is within the above-described range, the flow rate (velocity) of the molten resin can be sufficiently adjusted. Here, the "length of the flow rate adjusting zone 25" is, for example, a length of a portion, in the screw 20, positioned on the downstream side of the ring 26 and on the upstream side of the small diameter portion 20B. In the screw 20 and the screw 20a shown in FIG. 4 and FIG. 5A, respectively, the length of the flow rate adjusting zone 25 is the total of the lengths of the pressure reducing portion 20C and the compressing portion 20D in the flow direction of the molten resin.

Next, the starvation zone 23 will be explained. As described above, the flow amount (flow rate) of the resin supplied from the compression zone 22 to the starvation zone 23 via the flow rate adjusting zone 25 is lowered, and the starvation zone 23 is unfulfilled with the molten resin (is in the starved state) (step S4 of FIG. 1). For the purpose of promoting the starved state of the molten resin, the screw 20 has a structure (small diameter portion 20B) in which the diameter of the shaft in the portion positioned in the starvation zone 23 is small (thin) and the screw flight is deep, as compared with the portion positioned in the compression zone 22, namely the portion on the upstream side of the ring 26.

In the embodiment of the present teaching, in order to stabilize the starved state of the molten resin in the starvation zone 23, it is also allowable to control the supply amount of the thermoplastic resin supplied to the plasticizing cylinder 210, for the following reason. That is, if the supply amount of the thermoplastic resin is excessively large, it is difficult to maintain the starved state. For example, the supply amount of the thermoplastic resin is controlled by using a general purpose feeder screw.

Further, the method of the embodiment of the present teaching may include detecting expansion of the molten resin from the introducing port 202, and stopping driving of the production apparatus 1000 including the plasticizing cylinder 210 in a case that the expansion of the molten resin from the introducing port 202 is detected. As for the starvation zone 23, the flight of the screw 20 is deep, and the amount of the accumulated resin is small. Therefore, even in a case that the inner diameter of the introducing port 202 is large, the molten resin scarcely expands from the introducing port 202. However, due to the reason described below, it is preferable that the molding apparatus 1000 of the embodiment of the present teaching is provided with an expansion detecting mechanism which detects the expansion of the molten resin from the introducing port 202. In order to maintain the starved state of the molten resin in the starvation zone 23, it is necessary that the difference, which is not less than a certain extent, should be provided between the fluidity (easiness to flow) of the resin in the compression zone 22 and the fluidity in the starvation zone 23. In order to obtain the difference in the fluidity, it is necessary to optimize, for example, the amount of the molten resin supplied to the compression zone 22, the outer diameter of the ring 26 which serves as the flow resistance, and the weighing condition. Once any stable molding condition is found out, it is possible to perform the stable molding. However, it is feared that the molten resin might expand from the introducing port 202 until arrival at the optimum molding condition. Therefore, especially in a case that the foamed molded product is mass-produced, it is preferable that the production condition is optimized by using a molding machine provided with the expansion detecting mechanism before the mass production.

Figure 3:
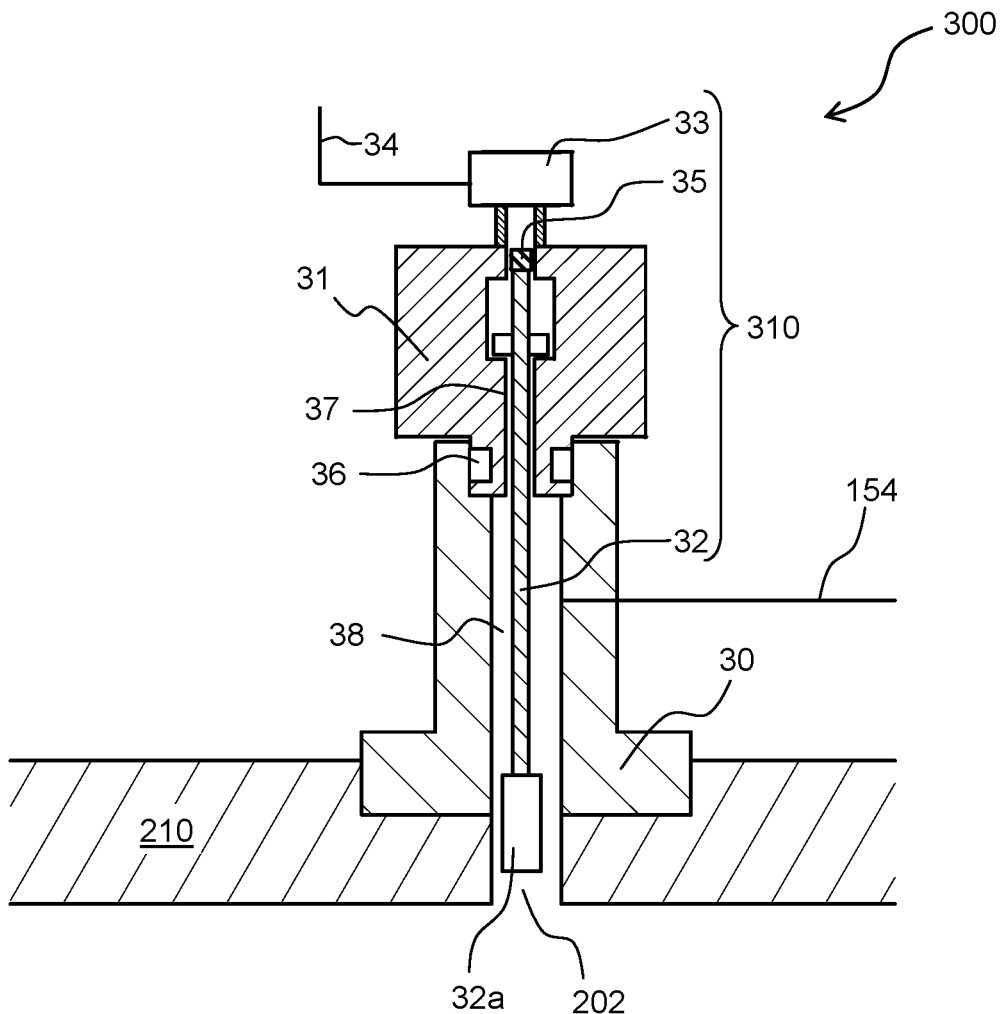
FIG. 3 schematically shows an introducing speed adjusting container used in the embodiment.

In the embodiment of the present teaching, the introducing speed adjusting container 300 is provided with an expansion detecting mechanism 310 which can stably and mechanically detect the expansion of the resin even in the case of the pressurized atmosphere. As shown in FIG. 3, the introducing speed adjusting container 300 has a cylindrical main body 30 which has a lower portion connected to the introducing port 202 and which has a space 38 therein for allowing the physical foaming agent to stay, and a lid 31 which is connected to the main body 30 to hermetically close the space 38 and which is formed with a through-hole 37 communicated with the space 38. The bomb 100 is connected to the space 38 by the aid of a piping 154, and the physical foaming agent is supplied via the piping 154. The space 38 is constantly in the pressurized state, because the physical foaming agent stays in the space 38. In order to hermetically close the space 38 in the pressurized state reliably, the lid 31 has a seal 36. The expansion detecting mechanism 310, which is provided for the introducing speed adjusting container 300, has a detection rod 32 (movable member) which is arranged in the space 38 and the through-hole 37 and which has its position that is displaceable in the upward direction by being brought in contact with the molten resin expanded from the vent, and a magnetic sensor 33 (detecting unit) which is arranged on the lid 31 so that the through-hole 37 is closed and which highly accurately detects the positional displacement of the detection rod 32 in a non-contact manner. The magnetic sensor 33 is connected to the control device (not shown) of the molding apparatus 1000 by a signal line 34.

As for the detection rod 32, the upper portion is retained in the through-hole 37, the lower portion extends from the through-hole 37 into the space 38, and a lower end portion 32a is inserted into the introducing port 202. Further, the detection rod 32 has a permanent magnet 35 which is disposed at an upper end portion of the detection rod 32. The detection rod 32 is retained in the through-hole 37 with no load without any interference exerted by surrounding parts. Therefore, the detection rod 32 can easily move in the upward direction (direction directed to the magnetic sensor 33) even under the pressurized atmosphere.

In a case that the molten resin intends to expand from the introducing port 202, then the molten resin is brought in contact with the lower end portion 32a of the rod 32, and the molten resin pushes and lifts the detection rod 32 in the upward direction. In accordance therewith, the position of the permanent magnet 35 is also displaced in the upward direction. The magnetic sensor 33 highly accurately detects the slight positional displacement of the permanent magnet 35 in the non-contact manner, and feeds the signal to the control device (not shown) of the production apparatus 1000 via the signal line 34. Accordingly, the control device detects the expansion of the resin. Then, the control device sends an error signal to stop the driving of the production apparatus 1000 including the plasticizing cylinder 210. Accordingly, it is possible to avoid, for example, such a trouble that the space 38 of the introducing speed adjusting container 300 is fulfilled with the molten resin and the lid 31 cannot be removed from the main body 30.

In the embodiment of the present teaching, it is preferable that the length of the starvation zone 23 in the flow direction of the molten resin is long in order to secure the contact area and the contact time between the molten resin and the physical foaming agent. However, if the length of the starvation zone 23 is excessively long, a harmful influence arises such that the molding cycle and/or the screw length are prolonged or lengthened. On this account, the length of the starvation zone is preferably in a range of twice to twelve times the inner diameter of the plasticizing cylinder 210 and more preferably in a range of four times to ten times the inner diameter of the plasticizing cylinder 210. Further, it is preferable that the length of the starvation zone 23 covers the entire range of the weighing stroke in the injection molding. That is, it is preferable that the length of the starvation zone 23 in the flow direction of the molten resin is not less than the length of the weighing stroke in the injection molding. The screw 20 is moved frontwardly and backwardly in accordance with the plasticization, the weighing, and the injection of the molten resin. However, in a case that the length of the starvation zone 23 is not less than the length of the weighing stroke, the introducing port 202 can be thereby arranged (formed) in the starvation zone 23 at all times during the production of the foamed molded product. In other words, even in a case that the screw 20 is moved frontwardly and backwardly during the production of the foamed molded product, any zone other than the starvation zone 23 is not located at the position of the introducing port 202. Accordingly, the physical foaming agent, which is introduced from the introducing port 202, is constantly introduced into the starvation zone 23 during the production of the foamed molded product. As described above, in a case that the starvation zone, which has the sufficient and appropriate size (length), is provided and that the physical foaming agent having the fixed pressure is introduced thereinto, then the starvation zone 23 can be thereby retained at the fixed pressure more easily. In the embodiment of the present teaching, as shown in FIG. 2, the length of the starvation zone 23 is substantially the same as the length of the portion of the screw 20 wherein the diameter of the shaft of the screw 20 and the depth of the screw flight are constant, namely, the length of the small diameter portion 20B of the screw 20 (see FIG. 4).

In the next place, the molten resin in the starved state and the physical foaming agent having the fixed pressure are brought in contact with each other in the starvation zone 23 in the state in which the starvation zone 23 is retained at the fixed pressure (Step S5 shown in FIG. 1). That is, the molten resin is pressurized at the fixed pressure by the physical foaming agent in the starvation zone 23. The starvation zone 23 is unfulfilled with the molten resin (starved state), and there is the space in which the physical foaming agent can exist. Therefore, the physical foaming agent and the molten resin can be efficiently brought in contact with each other. The physical foaming agent, which is brought in contact with the molten resin, permeates into the molten resin, and the physical foaming agent is consumed. In a case that the physical foaming agent is consumed, the physical foaming agent, which stays in the introducing speed adjusting container 300, is supplied to the starvation zone 23. Accordingly, the pressure of the starvation zone 23 is retained at the fixed pressure, and the molten resin is continuously brought in contact with the physical foaming agent having the fixed pressure.

In the case of the conventional foam molding based on the use of the physical foaming agent, the physical foaming agent at a high pressure, which is in a predetermined amount, has been forcibly introduced into the plasticizing cylinder within a predetermined time. Therefore, it has been necessary that the pressure of the physical foaming agent should be raised to the high pressure, and the amount of introduction, the time of introduction into the molten resin and the like should be correctly controlled. The physical foaming agent is brought in contact with the molten resin for only the short time of introduction. On the contrary, in the embodiment of the present teaching, the physical foaming agent is not forcibly introduced into the plasticizing cylinder 210. The physical foaming agent having the fixed pressure is continuously supplied into the plasticizing cylinder so that the pressure of the starvation zone 23 is fixed or constant, and the physical foaming agent is continuously brought in contact with the molten resin. Accordingly, the amount of dissolution (amount of permeation) of the physical foaming agent into the molten resin, which is determined by the temperature and the pressure, is stabilized. Further, the physical foaming agent of the embodiment of the present teaching is constantly brought in contact with the molten resin. Therefore, the physical foaming agent, which is in the necessary and sufficient amount, can permeate into the molten resin. Accordingly, in the case of the foamed molded product produced in the embodiment of the present teaching, the foam cells are fine, in spite of the use of the physical foaming agent having the low pressure as compared with any conventional molding method based on the use of the physical foaming agent.

Further, in the case of the production method of the embodiment of the present teaching, it is unnecessary to control, for example, the amount of introduction and the time of introduction of the physical foaming agent. Therefore, it is unnecessary to provide any driving valve including, for example a check valve and a solenoid-operated valve as well as any control mechanism for controlling the same. It is possible to suppress the apparatus cost. Further, the physical foaming agent, which is used in the embodiment of the present teaching, has the pressure lower than that of any conventional physical foaming agent. Therefore, the load on the apparatus is small as well.

In the embodiment of the present teaching, the starvation zone 23 is constantly retained at the fixed pressure during the production of the foamed molded product. In other words, all of the steps of the method for producing the foamed molded product are carried out, while continuously supplying the physical foaming agent having the fixed pressure in order to supplement the physical foaming agent consumed in the plasticizing cylinder. Further, in the embodiment of the present teaching, for example, in a case that the injection molding is continuously performed for a plurality of shots, the molten resin, which corresponds to the next shot, is also prepared in the plasticizing cylinder during the period in which the injection step, the cooling step for the molded product, and the taking out step for the molded product are performed. The molten resin, which corresponds to the next shot, is pressurized at the fixed pressure by the physical foaming agent. In other words, in the case of the injection molding for the plurality of shots performed continuously, 1 cycle of the injection molding, which includes, for example, the plasticization and weighing step, the injection step, the cooling step for the molded product, and the taking out step, is performed in the state in which the molten resin and the physical foaming agent having the fixed pressure are constantly present and brought in contact with each other in the plasticizing cylinder, i.e., in the state in which the molten resin is constantly pressurized at the fixed pressure by the physical foaming agent in the plasticizing cylinder. Similarly, in a case that the continuous molding such as the extrusion molding or the like is performed, the molding is also performed in the state in which the molten resin and the physical foaming agent having the fixed pressure are constantly present and brought in contact with each other in the plasticizing cylinder, i.e., in the state in which the molten resin is constantly pressurized at the fixed pressure by the physical foaming agent in the plasticizing cylinder.

In the next place, the molten resin, which has been brought in contact with the physical foaming agent, is molded into the foamed molded product (Step S6 shown in FIG. 1). The plasticizing cylinder 210 used in the embodiment of the present teaching has a recompression zone 24 which is arranged adjacently to the starvation zone 23 downstream from the starvation zone 23, and in which the molten resin is compressed and the pressure is raised. At first, the molten resin in the starvation zone 23 is allowed to flow to the recompression zone 24 in accordance with the rotation of the plasticizing screw 20. The molten resin, which contains the physical foaming agent, is subjected to the pressure adjustment in the recompression zone 24, the molten resin is fed (pushed out) to the front of the plasticizing screw 20, and the molten resin is weighed. In this procedure, the molten resin, which is fed (pushed out) to the front of the plasticizing screw 20, has the internal pressure which is controlled as the screw back pressure by a hydraulic motor or an electric motor (not shown) connected to the back of the plasticizing screw 20. In the embodiment of the present teaching, in order that the molten resin and the physical foaming agent are compatibly dissolved uniformly or homogeneously without separating the physical foaming agent from the molten resin and that the resin density is stabilized, it is preferable that the internal pressure of the molten resin fed to the front of the plasticizing screw 20, i.e., the screw back pressure is controlled to be higher than the pressure of the starvation zone 23 retained to be fixed or constant, by about 1 to 4 MPa. Note that in the embodiment of the present teaching, a check ring 50 is provided at a forward end of the screw 20 so that the compressed resin, which is disposed at the front of the screw 20, does not flow backward to the upstream side. Accordingly, the pressure of the starvation zone 23 is not affected by the resin pressure at the front of the screw 20 during the weighing.

The method for molding the foamed molded product is not specifically limited. For example, the molded product can be molded, for example, by the injection foam molding, the extrusion foam molding, or the foam blow molding. In the embodiment of the present teaching, the injection foam molding is performed such that the weighed molten resin is injected and charged into a cavity 253 in the mold 251 from the plasticizing cylinder 210 shown in FIG. 2. As for the injection foam molding, the short shot method may be used such that the molten resin, which is in a charge volume of 75% to 95% of the mold cavity volume, is charged into the mold cavity 253, and the mold cavity is subjected to the charging while expanding foams. Alternatively, the core back method may be used such that the molten resin, which is in a charge amount of 100% of the mold cavity volume, is charged, and then the cavity volume is expanded to cause the foaming. The obtained foamed molded product has foam cells at the inside. Therefore, the contraction or shrinking of the thermoplastic resin, which is caused during the cooling, is suppressed to mitigate the sink mark and the warpage. It is possible to obtain the molded product having a low specific gravity.

In the production method of the embodiment of the present teaching explained above, it is unnecessary to control, for example, the amount of introduction and the time of introduction of the physical foaming agent into the molten resin. Therefore, it is possible to omit or simplify the complicated control device, and it is possible to reduce the apparatus cost. Further, in the method for producing the foamed molded product of the embodiment of the present teaching, the molten resin in the starved state and the physical foaming agent having the fixed pressure are brought in contact with each other in the starvation zone 23 in the state in which the starvation zone 23 is retained at the fixed pressure. Accordingly, the amount of dissolution (amount of permeation) of the physical foaming agent with respect to the molten resin can be stabilized by the simple mechanism.

EXAMPLES

The present teaching will be further explained below by using Examples. However, the present teaching is not limited to Examples explained below.

Example 1

In Example 1, a foamed molded product was produced by using mineral-reinforced polyamide 6 (PA6) as the thermoplastic resin and utilizing nitrogen as the physical foaming agent.

(1) Production Apparatus

In Example 1, the production apparatus 1000 shown in FIG. 2 used in the embodiment described above was used. Details of the production apparatus 1000 will be explained. As described above, the production apparatus 1000 is the injection molding apparatus including the plasticizing cylinder 210, the bomb 100 which serves as the physical foaming agent supplying mechanism for supplying the physical foaming agent to the plasticizing cylinder 210, the clamping unit 250 which is provided with the mold 251, and the control device (not shown) which is provided to control the operations of the plasticizing cylinder 210 and the clamping unit 250.

A shutoff valve 28, which is opened/closed in accordance with the driving of an air cylinder, is provided at a nozzle forward end 29 of the plasticizing cylinder 210. The interior of the plasticizing cylinder 210 can be retained at a high pressure. The mold 251 is brought in tight contact with the nozzle forward end 29. The molten resin is injected and charged from the nozzle forward end 29 into the cavity 253 formed by the mold 251. A resin supply port 201 for supplying the thermoplastic resin to the plasticizing cylinder 210 and the introducing port 202 for introducing the physical foaming agent into the plasticizing cylinder 210 are formed in this order as referred to from the upstream side on the upper side surface of the plasticizing cylinder 210. A resin supplying hopper 211 and the introducing speed adjusting container 300 are arranged for the resin supply port 201 and the introducing port 202 respectively. The bomb 100 is connected to the introducing speed adjusting container 300 by the piping 154 via a buffer tank 153, a pressure reducing valve 151, and a pressure gauge 152. Further, a sensor (not shown) for monitoring the pressure is provided at the position opposed to the introducing port 202 of the plasticizing cylinder 210.

The screw 20 is arranged rotatably and movably back and forth in the plasticizing cylinder 210 in order to facilitate the plasticization and the melting of the thermoplastic resin and perform the weighing and the injection of the molten resin. As shown in FIG. 4, the screw 20 has, from the upstream side, the large diameter portion 20A, the pressure reducing portion 20C, the compressing portion 20D and the small diameter portion 20B. Further, the plasticizing cylinder 210 has, from the upstream side in the following order: the plasticization zone 21 in which the thermoplastic resin is plasticized and melted into the molten resin, the compression zone 22 in which the molten resin is compressed to thereby raise the pressure, the flow rate adjusting zone 25 in which the flow rate of the molten resin is adjusted, the starvation zone 23 which is unfulfilled with the molten resin, and the recompression zone 24 in which the molten resin subjected to the pressure reduction in the starvation zone is compressed again; each of the zones 21, 22, 25, 23 and 24 are formed in the inside of the plasticizing cylinder 210.

In the production apparatus 1000, the inner diameter of the plasticizing cylinder 210 was 35 mm, and the inner diameter of the introducing port 202 was 8 mm. Therefore, the inner diameter of the introducing port 202 was about 23% of the inner diameter of the plasticizing cylinder 210. The volume of the introducing speed adjusting container 300 was about 80 mL. Further, the length, in the flowing direction of the molten resin, of the flow rate adjusting zone 25 (the total of the lengths of the pressure reducing portion 20C and the compressing portion 20D) was 70 mm. Accordingly, the length in the flowing direction of the molten resin of the flow rate adjusting zone 25 was 2 times the inner diameter of the plasticizing cylinder 210. Furthermore, the length in the flowing direction of the molten resin of the starvation zone 23 (the length of the small diameter portion 20B) was 210 mm. Accordingly, the length in the flowing direction of the molten resin of the starvation zone 23 was 6 times the inner diameter of the plasticizing cylinder 210. Moreover, in Example 1, the mold, in which the size of the cavity 253 was 100 mm×200 mm×3 mm, was used.

(2) Production of Foamed Molded Product

In Example 1, a nitrogen bomb having a volume of 47 L, which was charged with nitrogen at 14.5 MPa, was used as the bomb 100. At first, the value of the pressure reducing valve 151 was set to 4 MPa. The bomb 100 was opened to supply nitrogen at 4 MPa from the introducing port 202 of the plasticizing cylinder 210 into the starvation zone 23 via the buffer container 153 having a volume of 0.99 L, the pressure reducing valve 151, the pressure gauge 152, and the introducing speed adjusting container 300. During the production of the molded product, the bomb 100 was open at all times.

In the plasticizing cylinder 210, the band heater (not shown) was used to adjust the plasticization zone 21 at 220° C., the compression zone 22 at 240° C., the starvation zone 23 at 220° C., and the recompression zone 24 at 240° C. Then, resin pellets of the thermoplastic resin (Gramide T777-02 produced by Toyobo) were supplied from the resin supplying hopper 211, and the screw 20 was forwardly rotated. Accordingly, the thermoplastic resin was heated and kneaded to provide the molten resin in the plasticization zone 21. The screw 20 was forwardly rotated at a back pressure of 6 MPa and a number of revolutions of 100 rpm, and the molten resin was thereby allowed to flow from the plasticization zone 21 to the compression zone 22. Further, the molten resin was allowed to flow to the flow rate adjusting zone 25 and the starvation zone 23.

The molten resin flowed to the starvation zone 23 through the gap between the inner wall of the plasticizing cylinder 210 and the large diameter portion 20A of the screw and the ring 26, and via the flow rate adjusting zone 25. Therefore, the supply amount of the molten resin supplied to the starvation zone 23 was restricted. Accordingly, the molten resin was compressed to raise the pressure in the compression zone 22 disposed on the upstream side of the ring 26, and the starvation zone 23 disposed on the downstream side was unfulfilled with the molten resin (starved state). Further, the molten resin was subjected to the pressure reduction and the compression to thereby adjust the flow rate of the molten resin in the flow rate adjusting zone 25 located in front of (on the upstream side of) the starvation zone 23 into which the molten resin was to flow, and then the molten resin was allowed to flow to the starvation zone 23. The starvation zone 23 was unfulfilled with the molten resin (starved state), and hence the physical foaming agent (nitrogen) introduced from the introducing port 202 was present in the space in which the molten resin was absent. The molten resin was pressurized by the physical foaming agent.

Further, the molten resin was fed to the recompression zone 24, and the molten resin was recompressed. The molten resin in an amount of one shot was weighed at the forward end portion of the plasticizing cylinder 210. After that, the shutoff valve 28 was opened to inject and charge the molten resin to the inside of the cavity 253 so that the charge ratio was 90% of the volume of the cavity 253, and thus the foamed molded product having a flat plate shape was molded (short shot method). After the molding, the foamed molded product was taken out from the interior of the mold after waiting for the cooling of the foamed molded product. The cooling time was 10 seconds. The molding cycle was 18 seconds as the value equivalent to that of the molding cycle of a solid molded product (unfoamed molded product).

The injection molding for the molded product explained above was continuously performed for 100 shots to obtain 100 individuals of foamed molded products. During the production of 100 individuals of foamed molded products, the pressure of the starvation zone 23 in the plasticizing cylinder 210 was constantly measured by the pressure sensor (not shown). As a result, the pressure of the starvation zone 23 was constantly at 4 MPa. Further, the pressure gauge 152, which indicated the pressure of nitrogen supplied to the starvation zone 23, had the value which was constantly 4 MPa during the production of the foamed molded product as well. According to the above, it was successfully confirmed that the molten resin was constantly pressurized by nitrogen at 4 MPa in the starvation zone 23 throughout 1 cycle of the injection molding including, for example, the plasticizing and weighing step, the injection step, the cooling step for the molded product, and the taking out step and that the molten resin was constantly pressurized by nitrogen in the starvation zone 23 during the continuous molding for 100 individuals of molded products. Further, it was confirmed that the expansion detecting mechanism 310 did not detect the expansion of the molten resin and the state of the starvation zone 23 was stable during the production of 100 individuals of foamed molded products.

The weight dispersion of the obtained 100 individuals of foamed molded products was evaluated by using the value ($\sigma$/ave. (%)) obtained by dividing the standard deviation ($\sigma$) by the weight average value (ave.). As a result, ($\sigma$/ave. (%))=0.21% was obtained. An evaluation similar to that described above was performed for solid molded products (unfoamed molded products). As a result, ($\sigma$/ave. (%)) =0.22% was obtained, which was the value equivalent to that of Example 1. According to this result, it has been revealed that the weight stability of the foamed molded product of Example 1 is equivalent to that of the solid molded product.

In Example 1, the foamed molded product, which had a specific gravity lighter than that of the solid molded product by about 10% and which had its corrected warpage, was successfully produced continuously and stably. It is considered that the ratio of reduction of the specific gravity is affected by the amount of dissolution (amount of permeation) of the physical foaming agent. According to this result, it was revealed that the amount of dissolution (amount of permeation) of the physical foaming agent with respect to the molten resin was stabilized. Further, the swirl mark, in which the separated gas was transferred to the molded product surface to deteriorate the surface property, was formed merely slightly. Further, the state of foam cells was observed for the cross section of the obtained foamed molded product. As a result, it was revealed that the average cell diameter of foam cells was 10 μm which was fine.

Example 2

In Example 2, carbon dioxide was used as the physical foaming agent. Therefore, a liquid carbon dioxide bomb having a pressure of 6 MPa was used as the bomb 100 as the apparatus for supplying the physical foaming agent. Then, the value of the pressure reducing valve 151 was set to 4.5 MPa. 100 individuals of foamed molded products were continuously produced by a method similar to that used in Example 1 except for the above.

During the production of the foamed molded product, the pressure of the starvation zone 23 in the plasticizing cylinder 210 was constantly measured by the pressure sensor (not shown). As a result, the pressure of the starvation zone 23 was constantly at 4.5 MPa. Further, the pressure gauge 152, which indicated the pressure of carbon dioxide supplied to the starvation zone 23, had the value which was constantly 4.5 MPa during the production of the foamed molded product as well. According to the above, it was successfully confirmed that the molten resin was constantly pressurized by carbon dioxide at 4.5 MPa in the starvation zone 23 throughout 1 cycle of the injection molding including, for example, the plasticizing and weighing step, the injection step, the cooling step for the molded product, and the taking out step and that the molten resin was constantly pressurized by carbon dioxide in the starvation zone 23 during the continuous molding for 100 individuals of molded products. Further, it was confirmed that the expansion detecting mechanism 310 did not detect the expansion of the molten resin and the state of the starvation zone 23 was stable during the production of 100 individuals of foamed molded products.

The weight dispersion of the obtained 100 individuals of foamed molded products was evaluated by using the value (σ/ave. (%)) obtained by dividing the standard deviation (σ) by the weight average value (ave.). As a result, (σ/ave. (%))=0.24% was obtained. An evaluation similar to that described above was performed for solid molded products (unfoamed molded products). As a result, (σ/ave. (%)) =0.22% was obtained, which was the value equivalent to that of Example 2, in the similar manner as in Example 1. According to this result, it has been revealed that the weight stability of the foamed molded product of Example 2 is equivalent to that of the solid molded product.

In Example 2, the foamed molded product, which had a specific gravity lighter than that of the solid molded product by about 10% and which had its corrected warpage, was successfully produced continuously and stably. According to this result, it was revealed that the amount of dissolution (amount of permeation) of the physical foaming agent with respect to the molten resin was stabilized. Further, the state of foam cells was observed for the cross section of the obtained foamed molded product. As a result, the average cell diameter of foam cells was 50 μm which was larger than that of Example 1. It is speculated that the difference in the size of the foam cell between Example 2 and Example 1 results from the difference in the type of the physical foaming agent.

According to the result of Example 2, it has been revealed that the pressure of the starvation zone 23 can be retained by the simple and convenient method, and the effect, which is the same as or equivalent to that of Example 1 based on the use of nitrogen as the physical foaming agent, is obtained, even in a case that carbon dioxide is used as the physical foaming agent.

Example 3

In Example 3, a polypropylene (PP) resin containing inorganic filler was used as the thermoplastic resin. Further, the value of the pressure reducing valve 151 was set to 8 MPa, and the core back method was used as the foam molding method. A foamed molded product was produced by a similar method to that of Example 1 except for the above.

PP resin pellets containing no reinforcing material such as an inorganic filler or the like (Prime Polypro J105G produced by Prime Polymer) and master batch pellets containing 80% by weight of talc as an inorganic filler (MP480 produced by Lion Idemitsu Composites) were mixed with each other so that the weight ratio was 80:20. In the similar manner to that in Example 1, the mixed resin material was supplied from the resin supplying hopper 211 into the plasticizing cylinder 210 to plasticize and weigh the resin material in the plasticizing cylinder 210. The shutoff valve 28 was opened, and the molten resin was injected and charged into the cavity 253 so that the charge ratio was 100% of the volume of the cavity 253. Three seconds thereafter, the clamping unit 250 was driven to move backwardly, and the mold was opened so that the cavity volume was expanded from 100% to 200%. Thus, the foamed molded product was molded (core back method). After the molding, the foamed molded product was taken out from the inside of the mold after waiting for the cooling of the foamed molded product. The cooling time was 30 seconds. Note that the core back method was used in Example 3. Therefore, the wall thickness of the molded product was increased, and the thermal insulation effect was enhanced as compared with Example 1 in which the short shot method was used. For this reason, the cooling time was longer than that of Example 1.

The injection molding for molding the molded product explained above was continuously performed for 30 shots to obtain 30 individuals of foamed molded products. During the production of the foamed molded product, the pressure of the starvation zone 23 in the plasticizing cylinder 210 was constantly measured by the pressure sensor (not shown). As a result, the pressure of the starvation zone 23 was constantly at 8 MPa. Further, the pressure gauge 152, which indicated the pressure of nitrogen supplied to the starvation zone 23, had the value which was constantly 8 MPa during the production of the foamed molded product as well. According to the above, it was successfully confirmed that the molten resin was constantly pressurized by nitrogen at 8 MPa in the starvation zone 23 throughout 1 cycle of the injection molding including, for example, the plasticizing and weighing step, the injection step, the cooling step for the molded product, and the taking out step and that the molten resin was constantly pressurized by nitrogen in the starvation zone 23 during the continuous molding for 30 individuals of molded products.

In Example 3, the foamed molded product, which had a specific gravity lighter than that of the solid molded product by about 48% and which had its corrected warpage, was successfully produced continuously and stably. According to this result, it was revealed that the amount of dissolution (amount of permeation) of the physical foaming agent with respect to the molten resin was stabilized. Further, the surface state of the obtained foamed molded product was observed. The swirl mark, in which the separated gas was transferred to the molded product surface to deteriorate the surface property, was formed merely slightly. Further, the state of foam cells was observed for the cross section of the obtained foamed molded product. The average cell diameter of foam cells in the vicinity of the core layer was 20 μm which was fine.

Example 4

In Example 4, a thermoplastic resin containing a chemical foaming agent was used. A polypropylene (PP) resin containing an inorganic filler was used as the thermoplastic resin, and sodium hydrogencarbonate was used as the chemical foaming agent. Carbon dioxide was used as the physical foaming agent. A liquid carbon dioxide bomb having a pressure of 6 MPa was used as the bomb 100 as the apparatus for supplying the physical foaming agent. Then, the value of the pressure reducing valve 151 was set to 3 MPa. Further, the core back method was used as the foam molding method. A foamed molded product was produced by a similar method to that of Example 1 except for the above.

PP resin pellets containing no reinforcing material such as an inorganic filler or the like (Prime Polypro J105G produced by Prime Polymer) (pellets A), master batch pellets containing 80% by weight of talc as an inorganic filler (MP480 produced by Lion Idemitsu Composites) (pellets B), and master batch pellets containing 20% by weight of sodium hydrogencarbonate powder (Serumaiku master batch produced by Sankyo Kasei Corporation) (pellets C) were mixed with each other so that the weight ratio between the pellets A and the pellets B was 80:20 and that the content amount of the sodium hydrogencarbonate was 1.0% by weight.

In a similar manner to that in Example 1, the resin material was supplied from the resin supplying hopper 211 into the plasticizing cylinder 210 to plasticize and weigh the resin material in the plasticizing cylinder 210. The shutoff valve 28 was opened, and the molten resin was injected and charged into the cavity 253 so that the charge ratio was 100% of the volume of the cavity 253. Three seconds thereafter, the clamping unit 250 was driven to move backwardly, and the mold was opened so that the cavity volume was expanded from 100% to 200%. Thus, the foamed molded product was molded (core back method). After the molding, the foamed molded product was taken out from the inside of the mold after waiting for the cooling of the foamed molded product. The cooling time was 30 seconds. Note that the core back method was used in Example 4. Therefore, the wall thickness of the molded product was increased, and the thermal insulation effect was enhanced as compared with Example 1 in which the short shot method was used. For this reason, the cooling time was longer than that of Example 1.

The injection molding of the molded product as explained above was performed continuously for 30 times, and thus 30 individuals of the foamed molded product were obtained. During the production of the foamed molded product, the pressure of the starvation zone 23 in the plasticizing cylinder 210 was constantly measured by the pressure sensors (not shown). As a result, the pressure of the starvation zone 23 was constantly at 3 MPa. Further, the value of the pressure gauge 152, which indicated the pressure of carbon dioxide supplied to the starvation zone 23, was also constantly 3 MPa during the production of the foamed molded product. With this, it was successfully confirmed that the molten resin was constantly pressurized by carbon dioxide at 3 MPa in the starvation zone 23 throughout 1 cycle of the injection molding including, for example, the plasticizing and weighing step, the injection step, the cooling step for the molded product, and the taking out step.

In Example 4, the foamed molded product, which had a specific gravity lighter than that of the solid molded product by about 35% and which had its corrected warpage, was successfully produced continuously and stably. According to this result, it was revealed that the amount of dissolution (amount of permeation) of the physical foaming agent with respect to the molten resin was stabilized. Further, the swirl mark, in which the separated gas was transferred to the molded product surface to deteriorate the surface property, was formed merely slightly. Further, the state of foam cells was observed for the cross section of the obtained foamed molded product. As a result, it was revealed that the average cell diameter of foam cells was 80 μm.

According to the method of the present teaching, it is possible to simplify the apparatus mechanism concerning the physical foaming agent. Further, the foamed molded product, which is excellent in the foaming performance, can be efficiently produced at the low cost.

What is claimed is:

1. A producing method for producing a foam-molded product by using a plasticizing cylinder, dividing into zones including, from an upstream side in the following order: a plasticization zone, a flow rate adjusting zone, and a starvation zone, and the plasticizing cylinder having an introducing port via which a physical foaming agent is introduced into the starvation zone, the producing method comprising:
   plasticizing and melting a thermoplastic resin into a molten resin in the plasticization zone;
   adjusting a flow rate of the molten resin in the flow rate adjusting zone;
   allowing the molten resin, of which flow rate has been adjusted in the flow rate adjusting zone, to be in a starved state in the starvation zone;
   introducing a pressurized fluid containing the physical foaming agent having a constant pressure into the starvation zone so as to retain the starvation zone at the constant pressure;
   bringing the molten resin in the starved state in contact with the pressurized fluid containing the physical foaming agent having the constant pressure in the starvation zone in a state in which the starvation zone is retained at the constant pressure; and
   molding the molten resin, having been brought in contact with the pressurized fluid containing the physical foaming agent, into the foam-molded product.

2. The producing method according to claim 1, wherein the molten resin is pressurized with the pressurized fluid containing the physical foaming agent in the starvation zone.

3. The producing method according to claim 1, wherein the starvation zone is maintained constantly at the constant pressure during production of the foam-molded product.

4. The producing method according to claim 1, wherein an inner diameter of the introducing port is in a range of 20% to 100% of an inner diameter of the plasticizing cylinder.

5. The producing method according to claim 1, wherein the introducing port is opened at all times.

6. The producing method according to claim 1, wherein:
the plasticizing cylinder includes an introducing speed adjusting container connected to the introducing port;
the producing method further comprises supplying the pressurized fluid containing the physical foaming agent to the introducing speed adjusting container; and
the pressurized fluid containing the physical foaming agent having the constant pressure is introduced into the starvation zone from the introducing speed adjusting container.

7. The producing method according to claim 6, wherein a volume of the introducing speed adjusting container is in a range of 5 mL to 10 L.

8. The producing method according to claim 1, further comprising:
detecting expansion of the molten resin from the introducing port; and
stopping driving of the plasticizing cylinder in response to detecting the expansion of the molten resin from the introducing port.

9. The producing method according to claim 1, wherein a chemical foaming agent is contained in the thermoplastic resin in an amount in a range of 0.1% by weight to 3% by weight.

10. The producing method according to claim 1, wherein pressure reduction and compression of the molten resin are performed in the flow rate adjusting zone.

11. The producing method according to claim 10, wherein the pressure reduction and the compression of the molten resin are repeated for a plurality of times.

12. The producing method according to claim 1, wherein the flow rate of the molten resin is increased along a flowing direction of the molten resin in the flow rate adjusting zone.

13. The producing method according to claim 1, wherein a pressure of the molten resin is decreased along a flowing direction of the molten resin in the flow rate adjusting zone.

14. A producing apparatus which produces a foam-molded product, the producing apparatus comprising:
a plasticizing cylinder having a plasticizing screw rotatably arranged in the plasticizing cylinder, the plasticizing cylinder including (i) a plasticization zone for plasticizing and melting a thermoplastic resin into a molten resin, (ii) a flow rate adjusting zone for adjusting a flow rate of the molten resin, and (iii) a starvation zone for allowing the molten resin to be in a starved state, and the plasticizing cylinder is formed with an introducing port that introduces a physical foaming agent into the starvation zone;
an introducing speed adjusting container connected to the introducing port; and
a physical foaming agent supplying mechanism connected to the introducing speed adjusting container, and the physical foaming agent supplying mechanism supplies the physical foaming agent to the plasticizing cylinder via the introducing speed adjusting container, wherein:
a pressurized fluid containing the physical foaming agent having a constant pressure is introduced into the starvation zone so as to retain the starvation zone at the constant pressure;
the molten resin in the starved state is brought in contact with the pressurized fluid containing the physical foaming agent having the constant pressure in the starvation zone in a state in which the starvation zone is retained at the constant pressure; and
the molten resin having been brought in contact with the pressurized fluid containing the physical foaming agent is molded into the foam-molded product.

15. The producing apparatus according to claim 14, wherein an inner diameter of the introducing port is in a range of 20% to 100% of an inner diameter of the plasticizing cylinder; and
a volume of the introducing speed adjusting container is in a range of 5 mL to 10 L.

16. The producing apparatus according to claim 14, wherein the introducing port is opened at all times.

17. The producing apparatus according to claim 14, wherein the introducing speed adjusting container is provided with an expansion detecting mechanism which detects expansion of the molten resin from the introducing port.

18. The producing apparatus according to claim 14, wherein:
the plasticizing cylinder further comprises a compression zone for compressing the molten resin, the compression zone being arranged on an upstream side of the flow rate adjusting zone; and
the plasticizing screw has a pressure reducing portion and a compressing portion which are positioned in the flow rate adjusting zone, the pressure reducing portion reducing a pressure of the molten resin and the compressing portion compressing the molten resin.

19. The producing apparatus according to claim 18, wherein the plasticizing screw has a plurality of pairs of the pressure reducing portion and the compressing portion in the flow rate adjusting zone.

20. The producing apparatus according to claim 19, wherein:
the pressure reducing portion and the compressing portion are arranged adjacently from the upstream side in this order;
a diameter of a shaft of the plasticizing screw in the pressure reducing portion is smaller than a maximum value of a diameter of the shaft of the plasticizing screw in the compression zone adjacently arranged on an upstream side of the pressure reducing portion or in the compressing portion; and
the diameter of the shaft of the plasticizing screw in the compressing portion is greater than a minimum value of the diameter of the shaft of the plasticizing screw in the pressure reducing portion adjacently arranged on an upstream side of the compressing portion.

21. The producing apparatus according to claim 14, wherein the plasticizing screw has a screw flight which has a notch and which is positioned in the flow rate adjusting zone.

22. The producing apparatus according to claim 14, wherein in the flow rate adjusting zone, a diameter of a shaft of the plasticizing screw continuously decreases from an upstream side toward a downstream side.

23. The producing apparatus according to claim 14, wherein the flow rate of the molten resin is increased along a flowing direction of the molten resin in the flow rate adjusting zone.

24. The producing apparatus according to claim 14, wherein a pressure of the molten resin is decreased along a flowing direction of the molten resin in the flow rate adjusting zone.

25. A plasticizing screw for a plasticizing cylinder of a producing apparatus which produces a foam-molded product, the plasticizing screw comprising:
a screw shaft;
a screw flight; and a seal mechanism, wherein:
- by the screw shaft and the screw flight, the plasticizing cylinder includes, from an upstream side in this order, (i) a compression zone for compressing a molten resin, (ii) a flow rate adjusting zone for adjusting a flow rate of the molten resin, (iii) a starvation zone for allowing the molten resin to be in a starved state, and (iv) a recompression zone for recompressing the molten resin;
- a physical foaming agent is introduced into the starvation zone;
- the seal mechanism is arranged between the compression zone and the flow rate adjusting zone, the seal mechanism being configured to prevent counter flow of the molten resin from the flow rate adjusting zone to the compression zone; and
- the screw shaft and the screw flight are configured to repeat pressure reduction and compression of the molten resin for a plurality of times in the flow rate adjusting zone.

26. The plasticizing screw according to claim 25, further comprising a pressure reducing portion and a compressing portion in the flow rate adjusting zone, the pressure reducing portion reducing a pressure of the molten resin and the compressing portion compressing the molten resin.

27. The plasticizing screw according to claim 26, further comprising a plurality of pairs of the pressure reducing portion and the compressing portion in the flow rate adjusting zone.

28. The plasticizing screw according to claim 27, wherein:
- the pressure reducing portion and the compressing portion are arranged adjacently from the upstream side in this order;
- a diameter of the screw shaft in the pressure reducing portion is smaller than a maximum value of a diameter of the screw shaft in the compression zone adjacently arranged on an upstream side of the pressure reducing portion or in the compressing portion; and
- the diameter of the screw shaft in the compressing portion is greater than a minimum value of the diameter of the screw shaft in the pressure reducing portion adjacently arranged on an upstream side of the compressing portion.

* * * * *